US 9,535,269 B2

(12) United States Patent
Shibata et al.

(10) Patent No.: US 9,535,269 B2
(45) Date of Patent: Jan. 3, 2017

(54) EYEGLASS FRAME SHAPE MEASURING APPARATUS

(71) Applicant: NIDEK CO., LTD., Gamagori, Aichi (JP)

(72) Inventors: Ryoji Shibata, Toyokawa (JP); Tomoji Tanaka, Okazaki (JP)

(73) Assignee: NIDEK CO., LTD., Aichi (JP)

( * ) Notice: Subject to any disclaimer, the term of this patent is extended or adjusted under 35 U.S.C. 154(b) by 169 days.

(21) Appl. No.: 14/311,666

(22) Filed: Jun. 23, 2014

(65) Prior Publication Data

US 2014/0373368 A1    Dec. 25, 2014

(30) Foreign Application Priority Data

Jun. 24, 2013    (JP) ................................. 2013-131905
Jun. 24, 2013    (JP) ................................. 2013-131906

(51) Int. Cl.
     *G02C 3/00*        (2006.01)
     *G02C 13/00*      (2006.01)
     (Continued)

(52) U.S. Cl.
     CPC ............. *G02C 13/003* (2013.01); *B24B 9/146* (2013.01); *B24B 49/00* (2013.01); *G01B 5/20* (2013.01); *G02C 13/00* (2013.01)

(58) Field of Classification Search
     CPC ....... G02C 13/003; G02C 13/00; B24B 49/00; B24B 9/146; G01B 5/20
     (Continued)

(56) References Cited

U.S. PATENT DOCUMENTS 5,594,992 A *   1/1997   Suzuki .................... B24B 9/144
                                                        33/200
5,973,772 A *   10/1999   Fukuma ............. G01M 11/0235
                                                        33/200

(Continued)

FOREIGN PATENT DOCUMENTS

EP          2335873 A1    6/2011
FR          2934060 A1    1/2010
(Continued)

OTHER PUBLICATIONS

Search Report dated Nov. 12, 2014, issued by the European Patent Office in counterpart European Application No. 14173614.0.

(Continued)

*Primary Examiner* — R. A. Smith
*Assistant Examiner* — Tania Courson
(74) *Attorney, Agent, or Firm* — Sughrue Mion, PLLC

(57) ABSTRACT

There is provided an eyeglass frame shape measuring apparatus includes an eyeglass frame holding unit which holds an eyeglass frame, and a measuring unit which measures a shape of a rim of the eyeglass frame by tracing a contour of the rim of the eyeglass frame. The measuring unit includes a tracing stylus which is inserted into a groove of the rim, a tracing stylus moving unit which moves the tracing stylus in a radial direction of the rim, and a rotating unit which rotates the tracing stylus moving unit about a first axis set to pass through an inside of the contour of the rim such that the tip of the tracing stylus traces the rim along the contour of the rim, and which is disposed on a rear side of the eyeglass frame held by the eyeglass frame holding unit.

21 Claims, 13 Drawing Sheets

(51) Int. Cl.
*G01B 5/20* (2006.01)
*B24B 49/00* (2012.01)
*B24B 9/14* (2006.01)

(58) Field of Classification Search
USPC .................. 33/28, 200, 507, 551, 553, 554
See application file for complete search history.

(56) References Cited

U.S. PATENT DOCUMENTS

| | | | |
|---|---|---|---|
| 6,243,960 B1 | 6/2001 | Andrews et al. | |
| 6,325,700 B1 | 12/2001 | Mizuno et al. | |
| 6,427,350 B1 * | 8/2002 | Asaoka | B24B 9/144 |
| | | | 33/200 |
| 7,631,431 B2 | 12/2009 | Matsuyama | |
| 7,874,079 B2 | 1/2011 | Andrews et al. | |
| 8,015,716 B2 | 9/2011 | Matsuyama | |
| 8,844,146 B2 * | 9/2014 | Matsuyama | G01B 5/20 |
| | | | 33/200 |
| 9,080,853 B2 * | 7/2015 | Yamamoto | G01B 5/20 |
| 9,086,582 B1 * | 7/2015 | Barton | G02C 13/005 |
| 2005/0275802 A1 | 12/2005 | Nauche et al. | |
| 2012/0117811 A1 | 5/2012 | Andrews et al. | |

FOREIGN PATENT DOCUMENTS

| | | |
|---|---|---|
| FR | 2934903 A1 | 2/2010 |
| JP | 62-169008 A | 7/1987 |
| JP | 2000-304530 A | 11/2000 |
| JP | 2000-314617 A | 11/2000 |
| JP | 2011-122898 A | 6/2011 |
| WO | 0022976 A1 | 4/2000 |

OTHER PUBLICATIONS

EESR issued Mar. 13, 2015, by the EPO in related Application No. 14173614.0.
Nidek, Satellite Tracer LT-1200 / 980, Copyright 2013.

* cited by examiner

EYEGLASS FRAME SHAPE MEASURING APPARATUS

CROSS-REFERENCE TO RELATED APPLICATION

This application claims priority from Japanese Patent Application Nos. 2013-131905 and 2013-131906, both filed on Jun. 24, 2013, the entire subject matter of which is incorporated herein by reference.

TECHNICAL FIELD

The present invention relates to an eyeglass frame shape measuring apparatus which traces a rim of an eyeglass frame.

BACKGROUND

An eyeglass frame shape measuring apparatus includes an eyeglass frame holding unit which holds an eyeglass frame, and a measuring unit which moves a tracing stylus inserted into a rim of the held eyeglass frame along a contour of the rim (refer to JP-A-2011-122898, JP-A-2000-304530 and JP-A-2000-314617). The eyeglass frame shape measuring apparatus includes a moving mechanism which moves the measuring unit to each of measurement positions of a right rim and a left rim in order to measure the right rim and the left rim held by the eyeglass frame holding unit. The eyeglass frame holding unit includes two sliders which are movable to be open and closed in order to hold the right rim and the left rim of the eyeglass frame by interposing the rims therebetween in a longitudinal direction (upper-lower direction of eyeglasses when worn).

However, in a related-art eyeglass frame shape measuring apparatus, a main mechanism of the measuring unit is disposed on a front side (a side opposite to an eye side of a wearer) of the eyeglass frame held by the eyeglass frame holding unit. In such a configuration, it is difficult to measure a high-curve frame.

In the apparatus of JP-A-2011-122898, in order to measure a high-curve frame, a tip of the tracing stylus is configured to be tiltable on a rear side of the eyeglass frame. However, since the measuring unit is disposed on a front side of the eyeglass frame, the apparatus employs a mechanism which causes a holding mechanism of a tracing stylus shaft to largely move outward further than a contour of the rim, so that a size of the mechanism of the measuring unit would increase.

In the apparatus of JP-A-2000-304530, since the measuring unit is disposed on the front side of the eyeglass frame, the tip of the tracing stylus is configured to tilt on the front side of the eyeglass frame. Therefore, there would be a problem in that the tip of the tracing stylus does not precisely come into contact with a rim groove when measuring the high-curve frame, and there would be another problem in that the tracing stylus easily deviates from the rim groove. That is, this apparatus cannot support measurement of the high-curve frame.

In the apparatus of JP-A-2000-314617, a tracing stylus shaft and a tilt angle of the tip of the tracing stylus are fixed, and therefore, there would be a problem in that the tracing stylus does not precisely come into contact with the rim groove when measuring the high-curve frame, and there would be another problem in that the tracing stylus easily deviates from the rim groove.

Further, in a related-art eyeglass frame holding unit, guide mechanisms which move two sliders to be open and closed are disposed at both right and left ends of the sliders, respectively. Since an operator holds the right and left temples of the eyeglass frame with one's hands, it is difficult to set the frame between two sliders in the related-art apparatus. Particularly, in a configuration where the eyeglass frame is disposed in a substantially horizontal direction, or in a configuration where a measuring mechanism is provided on a rear side (an eye side of a wearer) of the eyeglass frame, it would be more difficult for the operator to set the eyeglass frame. Further, the related-art apparatus requires a large space in a left-right direction, so that a size of the apparatus would increase.

SUMMARY

Accordingly, an aspect of the present invention provides solution to at least one of the problems described above. Another aspect of the present invention provides an eyeglass frame shape measuring apparatus which can measure a high-curve frame without increasing a size of the apparatus. A further aspect of the present invention provides an eyeglass frame shape measuring apparatus which is advantageous in cost without causing the mechanism to be complicated. A further aspect of the present invention provides an eyeglass frame shape measuring apparatus in which the eyeglass frame can be easily set. A further aspect of the present invention provides an eyeglass frame shape measuring apparatus which can reduce a size of the apparatus. A further aspect of the present invention provides an eyeglass frame shape measuring apparatus which can simplify a mechanism of holding the eyeglass frame while reducing a size of the apparatus.

According to an illustrative embodiment of the present invention, there is provided an eyeglass frame shape measuring apparatus comprising:
an eyeglass frame holding unit which is configured to hold an eyeglass frame; and
a measuring unit which is configured to measure a shape of a rim of the eyeglass frame by tracing a contour of the rim of the eyeglass frame,
  wherein the measuring unit includes:
  a tracing stylus which is inserted into a groove of the rim;
  a tracing stylus moving unit which is configured to move the tracing stylus in a radial direction of the rim; and
  a rotating unit which is configured to rotate the tracing stylus moving unit about a first axis set to pass through an inside of the contour of the rim such that the tip of the tracing stylus traces the rim along the contour of the rim, and which is disposed on a rear side of the eyeglass frame held by the eyeglass frame holding unit.

According to another illustrative embodiment of the present invention, there is provided an eyeglass frame shape measuring apparatus comprising:
an eyeglass frame holding unit which is configured to hold an eyeglass frame; and
a measuring unit which is configured to measure a shape of a rim of the eyeglass frame by tracing a contour of the rim of the eyeglass frame,
  wherein the frame holding unit includes:
  a first slider and a second slider which are configured to hold the left and right rims of the eyeglass frame by interposing the rims therebetween in a longitudinal direction of the eyeglass frame when worn; and
  a guide mechanism which is configured to guide the first slider and the second slider to be movable in the longitudinal direction, and is disposed in a middle portion of the first slider and the second slider in a left-right direction at at least between the first slider and the second slider.

According to the above configuration, a high-curve frame can be more easily measured. Further, an operator can set an eyeglass frame more easily, and a size of the apparatus can be reduced.

BRIEF DESCRIPTION OF THE DRAWINGS

The above and other aspects of the present disclosure will become more apparent and more readily appreciated from the following description of illustrative embodiments of the present disclosure taken in conjunction with the attached drawings, in which.

DETAILED DESCRIPTION

Figure 1:
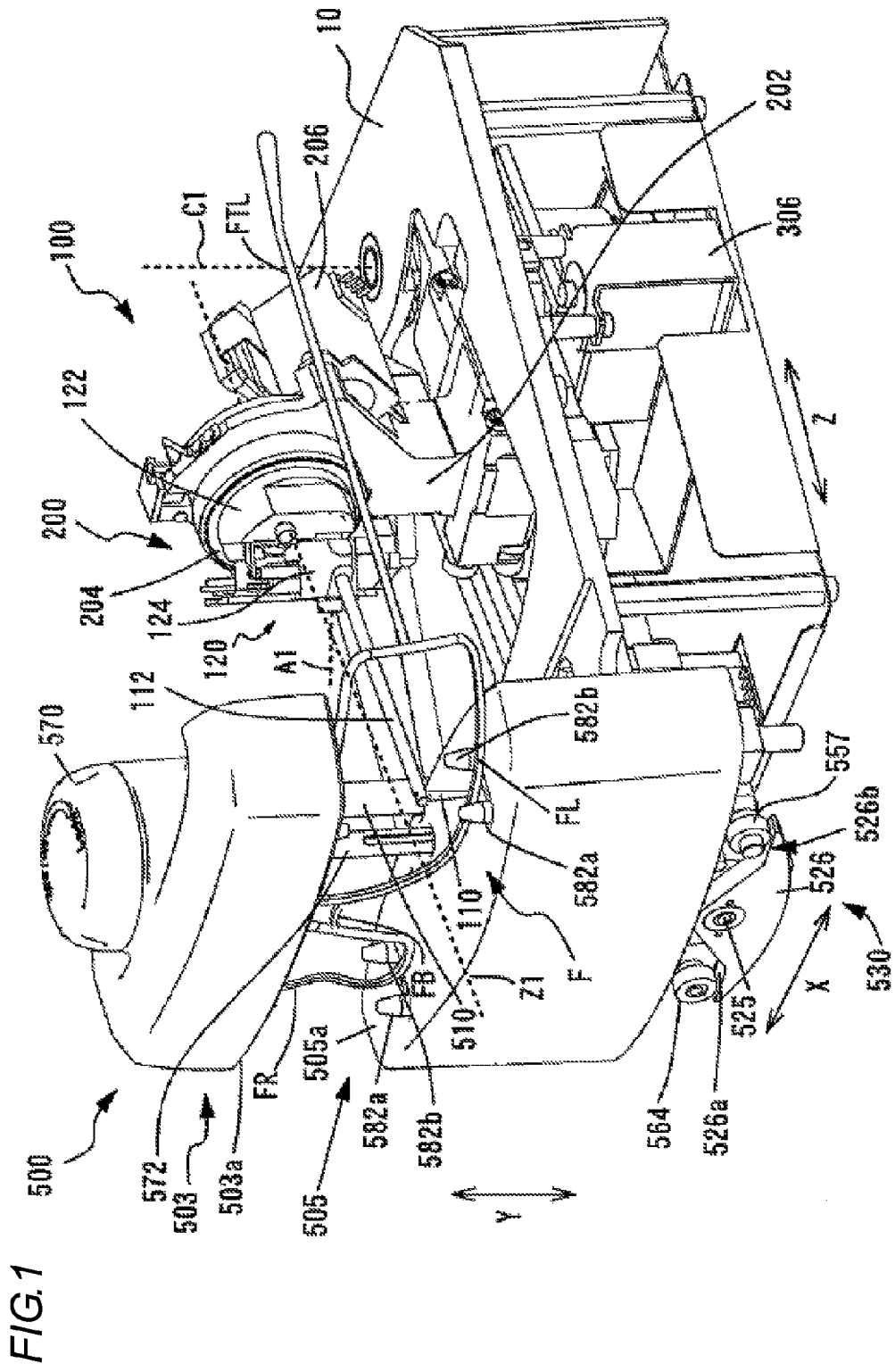
FIG. 1 is an overall schematic view of an eyeglass frame shape measuring apparatus.

Hereinafter, illustrative embodiments of the present invention will be described with reference to the drawings. FIG. 1 is an overall schematic view of an eyeglass frame shape measuring apparatus.

An eyeglass frame shape measuring apparatus 1 has a frame holding unit 500 which holds an eyeglass frame F in a predetermined measurement state, and a measuring unit 100 which traces a contour of a rim of the frame F held by the frame holding unit 500 to measure a three-dimensional shape of the rim. The frame holding unit 500 is disposed on a front side of a main body base 10. A main mechanism of the measuring unit 100 is disposed in the main body base 10 and positioned on a rear side (side where the eyes of a wearer are located) of the eyeglass frame F held by the frame holding unit 500.

A configuration of the frame holding unit 500 will be described with reference to FIGS. 1 to 4. The frame holding unit 500 includes a first slider 503 and a second slider 505 which move in a longitudinal direction (Y-direction), and includes a guide mechanism 508 which guides the first slider 503 and the second slider 505 to be movable in the longitudinal direction, in order to interpose and hold the right and left rims (FR, FL) of the eyeglass frame F therebetween in the longitudinal direction (upper-lower direction) of the eyeglass frame when worn. The guide mechanism 508 is disposed in a middle portion of the first slider 503 and the second slider 505 in a left-right direction (X-direction) at at least between the first slider 503 and the second slider 505. Incidentally, in this illustrative embodiment, the longitudinal direction (upper-lower direction) of the eyeglass frame when worn is based on a wearer of the eyeglass frame F.

The guide mechanism 508 shown in FIGS. 1 to 4 has a support column member 510 which is configured to guide at least either one of the first slider 503 or the second slider 505 to be movable in the longitudinal direction. The support column member 510 extends between the first slider 503 and the second slider 505 in the longitudinal direction, and is disposed in the middle portion of the first slider 503 and the second slider 505 in the left-right direction. The support column member 510 is disposed on a rear side of a bridge FB of the frame F held by the first slider 503 and the second slider 505. A width of the support column member 510 in the left-right direction is set to be equal to or less than a left-right width of the bridge FB of the frame F. Preferably, the width of the support column member 510 in the left-right direction is set to be equal to or less than a width (distance) between a nose side end (position on the midmost side in left-right direction) of the right rim FR and the nose side end of the left rim FL. The width of the support column member 510 in the left-right direction refers to a width of a support column portion in the left-right direction at least present between the first slider 503 and the second slider 505.

According to this illustrative embodiment shown in FIG. 1, in the frame holding unit 500, the first slider 503 is disposed on an upper side and the second slider 505 is disposed on a lower side so as to interpose the eyeglass frame F therebetween in a vertical direction, in order to hold the eyeglass frame F in a horizontal direction similar to a case where a wearer wears the eyeglass frame F. However, the frame holding unit 500 may be configured to interpose the eyeglass frame F in the horizontal direction or in a direction tilted forward or rearward, without being limited to a vertical direction.

In this illustrative embodiment shown in FIG. 1, the first slider 503 has a cover 503a, and a surface (lower surface of cover 503a, in FIG. 1) of the cover 503a facing the second slider 505 comes into contact with an upper end (or lower end) of the right and left rims. The second slider 505 has a cover 505a, and a surface (upper surface of cover 505a, in FIG. 1) of the cover 505a facing the first slider 503 comes into contact with the lower end (or upper end) of the right and left rims. The upper and lower ends of the right and left rims of the eyeglass frame F coming into contact with the first slider 503 and the second slider 505 may be opposite.

Figure 2:
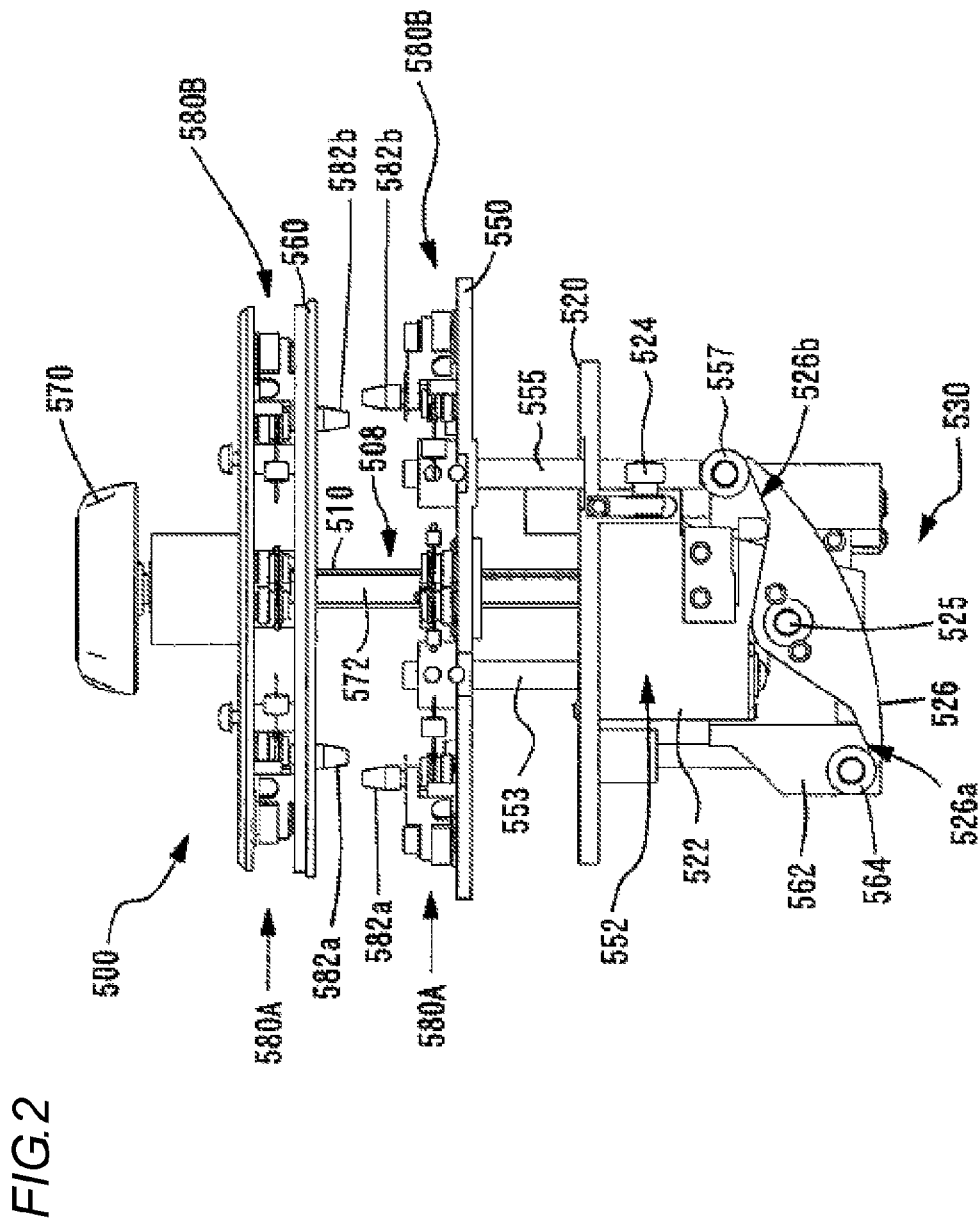
FIG. 2 is a front view of a frame holding unit.
Figure 3:
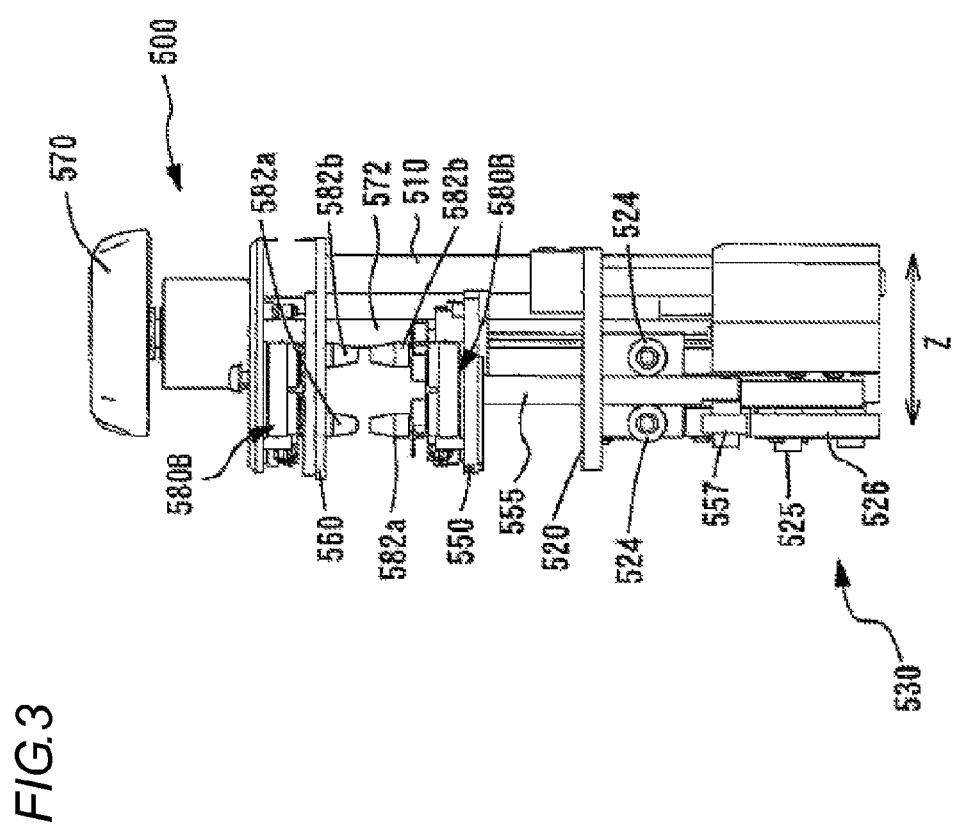
FIG. 3 is a right side view of the frame holding unit of FIG. 2.
Figure 4:
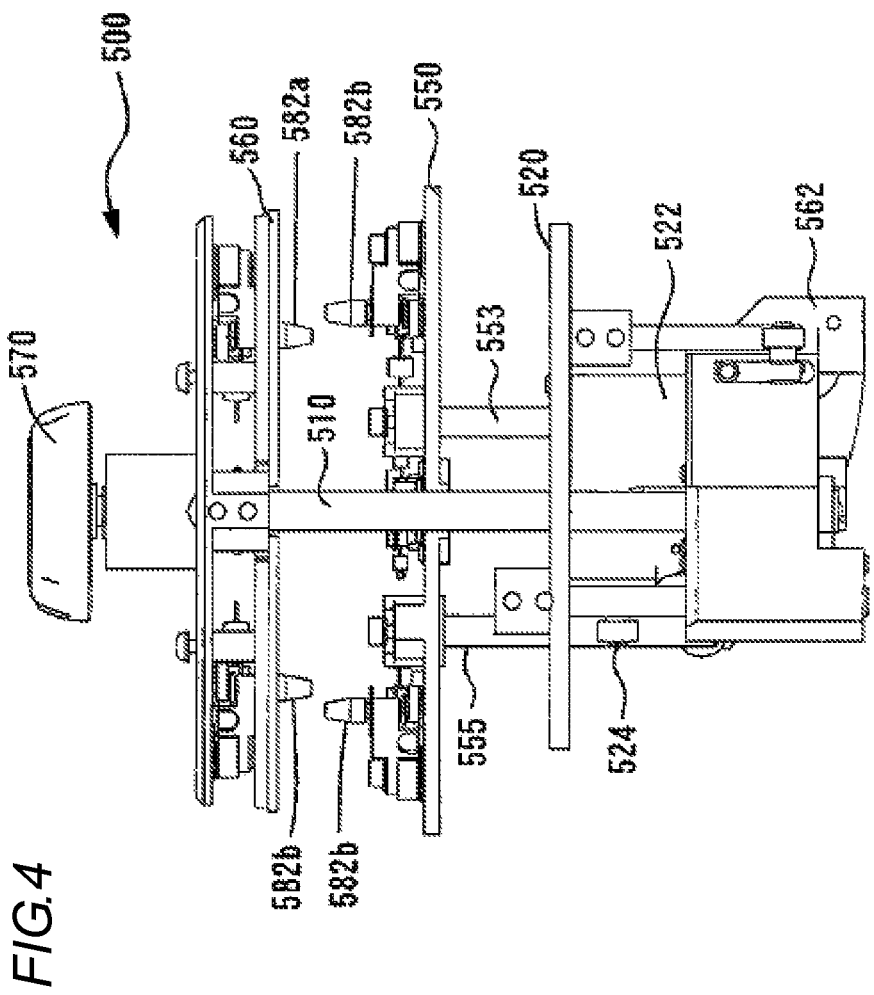
FIG. 4 is a rear view of the frame holding unit of FIG. 2.

FIG. 2 is a front view of the frame holding unit 500 in a state where the covers 503a and 505a are removed. FIG. 3 is a right side view of the frame holding unit 500 of FIG. 2. FIG. 4 is a rear view of the frame holding unit 500 of FIG. 2 in the state where the covers 503a and 505a are removed.

As shown in FIGS. 1 to 4, the X-direction indicates the left-right direction, the Y-direction indicates the longitudinal direction (upper-lower direction), and the Z-direction indicates a front-rear direction.

In FIGS. 2 to 4, a fixing base 520 is fixed to the main body base 10 of the apparatus. A slide plate 550 included in the second slider 505 is held to be movable in the longitudinal direction (Y-direction) above the fixing base 520. Two shafts 553 and 555 are fixed under the slide plate 550. The shaft 553 is supported to be movable in the longitudinal direction by a block 522 to which the fixing base 520 is fixed. The shaft 555 is supported to be movable in the longitudinal direction by two rollers 524 which are attached to the fixing base 520. A support mechanism 552 which supports the second slider 505 in the longitudinal direction has the shaft 553, the shaft 555, the fixing base 520, the block 522, the rollers 524 and the like.

A slide plate 560 included in the first slider 503 is fixed to an upper portion of the support column member 510. The support column member 510 is held to be movable in the longitudinal direction by the fixing base 520, the block 522 and the like. In this illustrative embodiment shown in FIGS. 1 to 4, the support column member 510 also serves as a guide mechanism which guides the first slider 503 to be movable in the longitudinal direction. An attachment plate 562 (refer to FIG. 4) is attached to a lower portion of the support column member 510. A first roller 564 is attached to a lower portion (refer to FIG. 2) of the attachment plate 562 on the front side. An arc member 526 rotatable about a shaft 525 which extends in the front-rear direction (Z-direction) is attached to a lower portion of the block 522 on the front side. The arc member 526 has a first arm 526a and a second arm 526b which extend in the left-right direction. The first roller 564 is mounted on an upper surface of the first arm 526a. A second roller 557 is attached to the lower end of the shaft 555 on the front side which is fixed to the slide plate 550. The second roller 557 is mounted on an upper portion of the second arm 526b of the arc member 526. An interlocking mechanism 530 is configured to make the first slider 503 and the second slider 505 to be interlocked so as to move in a direction in which a gap between the first slider 503 and the second slider 505 is widened as well as in a direction in which the gap therebetween is narrowed. That is, when the slide plate 550 (second slider 505) is in a raised state, the first arm 526a of the arc member 526 is lowered, and thus, the first roller 564 is also lowered. Accordingly, the slide plate 560 (first slider 503) is lowered, thereby narrowing (closing) the gap between the first slider 503 and the second slider 505. When the slide plate 560 (first slider 503) moves in an upper direction, the first roller 564 rises, and thus, the first arm 526a of the arc member 526 is also able to rise while the second arm 526b of the arc member 526 is able to be lowered. The slide plate 550, the shaft 555 and the second roller 557 are lowered due to their own weights. Accordingly, the gap between the first slider 503 and the second slider 505 is widened (open).

A rotation knob 570 is provided in an upper portion of the slide plate 560 (first slider 503). A rotation shaft 572 extending in the longitudinal direction (Y-direction) is attached to the rotation knob 570. The rotation shaft 572 is disposed in the middle portion of the first slider 503 and the second slider 505 in the left-right direction. Preferably, the rotation shaft 572 is disposed on a front side of the support column member 510, that is, on a rear side of the bridge FB of the frame held by the first slider 503 and the second slider 505. The rotation shaft 572 is held by the slide plate 550, the slide plate 560 and the fixing base 520 to be rotatable and movable along with the support column member 510 in the longitudinal direction. The rotation knob 570 and the rotation shaft 572 are used to clamp the rims (FL, FR) of the eyeglass frame F using a front pin and a rear pin.

Figure 5:
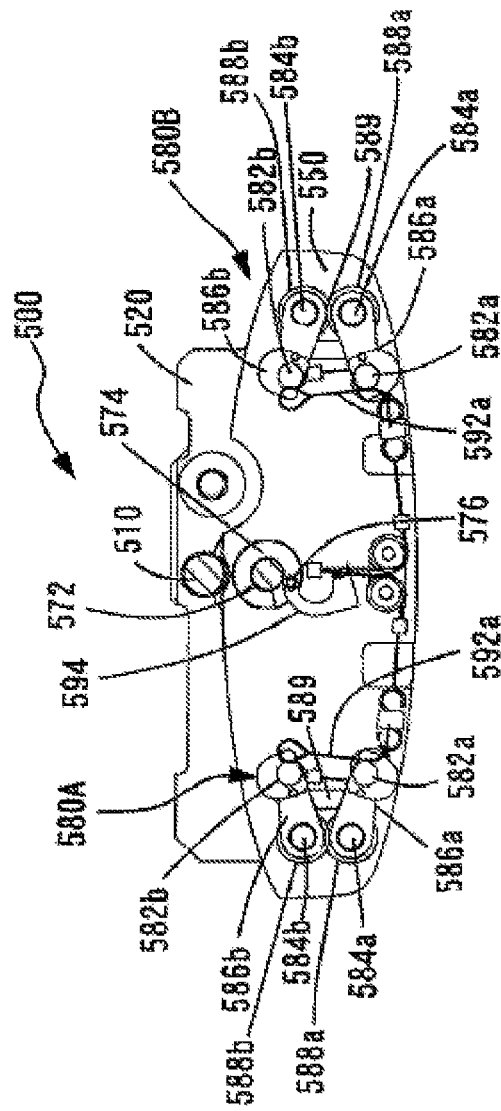
FIG. 5 is a top view of a slide plate and shows a clamping mechanism which clamps rims in a front-rear direction by using a front pin and a rear pin.

FIG. 5 is a top view of the slide plate 550 and shows a clamping mechanism which clamps the rims (FL, FR) of the eyeglass frame F in the front-rear direction by using the front pin and the rear pin.

In FIG. 5, a clamping mechanism 580A has a pair of front and rear pins 582a and 582b which clamp the left rim FL in the front-rear direction. The front pin 582a is attached to an arm 586a which is rotatable about an axis 584a. The rear pin 582b is attached to an arm 586b which is rotatable about an axis 584b. A gear 588a having the axis 584a as the center is formed in a base portion of the arm 586a. Similarly, a gear 588b having the axis 584b as the center is also formed in a base portion of the arm 586b. The gear 588b engages with the gear 588a. In accordance with the engagement of the gears 588a, 588b, when the arm 586b rotates about the axis 584b, the arm 586a which is interlocked thereto also rotates about the axis 584a. In other words, the front pin 582a and the rear pin 582b are interlocked with each other so as to be opened and closed. A compression spring 589 is disposed between the arm 586a and the arm 586b. The compression spring 589 applies a biasing force to the arm 586a and the arm 586b in an opening direction.

In FIG. 5, a clamping mechanism 580B on a right side is bilaterally symmetrical to the clamping mechanism 580A described above. Therefore, the same reference numerals and signs are applied to each of the respective members and description thereof is omitted.

A wire 592a is attached to the arm 586b in the clamping mechanism 580A. An end of the wire 592a is connected to a half ring member 594 at the middle in the left-right direction via a guide member. The inner diameter of the half ring member 594 is formed to have a size to be engaged with the diameter of the rotation shaft 572. A circular member 574 is fixed to the rotation shaft 572. The half ring member 594 is connected to the circular member 574 by a pin 576. In FIG. 5, when the rotation shaft 572 rotates in the clockwise direction, the circular member 574 rotates integrally with the rotation shaft 572, and thus, the half ring member 594 moves to a position where the inner diameter of the half ring member 594 engages with the diameter of the rotation shaft 572. The wire 592 is pulled in accordance with the movement of the half ring member 594. Accordingly, the front pin 582a and the rear pin 582b of the clamping mechanism 580A move in a closing direction. When the rotation shaft 572 rotates counterclockwise, the half ring member 594 returns to the state of FIG. 5. A gap between the front pin 582a and the rear pin 582b is widened by the compression spring 589.

The wire 592a is also connected to the arm 586b of the clamping mechanism 580B, and one end of the wire 592a is connected to the half ring member 594. Therefore, the front pin 582a and the rear pin 582b of the clamping mechanism 580B are also opened and closed in accordance with the rotation of the rotation shaft 572 in the same manner as the clamping mechanism 580A.

The clamping mechanisms 580A and 580B are also disposed on the slide plate 560 on the first slider 503 side. The clamping mechanisms 580A and 580B on the slide plate 560 are configured to be vertically opposite with respect to that on the slide plate 550. Thus, description thereof will be omitted.

In this illustrative embodiment, an operator rotates the rotation knob 570 to drive the clamping mechanisms 580A and 580B. However, a motor may be used as driving means thereof. The clamping mechanisms 580A and 580B may use any known mechanism without being limited to this illustrative embodiment. The mechanism to fix the right and left rims in the front-rear direction may be provided with an abutment member having a V-shaped groove in each of the slide plates 550 and 560, in place of the pair of front and rear pins 582a and 582b.

Since the frame holding unit 500 has a configuration as described above, the eyeglass frame F is stably held in a predetermined measurement state by the first slider 503 and the second slider 505. In the frame holding unit 500 of this illustrative embodiment, the guide mechanism 508 which guides the first slider 503 and the second slider 505 to be movable in the longitudinal direction is not disposed in the right and left front ends of the first slider 503 and the second slider 505. In the frame holding unit 500, the support column member 510 which supports the first slider 503 to be movable in the longitudinal direction is disposed at the middle portion in the left-right direction at at least between the first slider 503 and the second slider 505. Therefore, both the right and left ends of the first slider 503 and the second slider 505 are open outward (spaces are provided in both the right and left ends). In other words, both the right and left ends between the first slider 503 and the second slider 505 are open (exposed). Accordingly, the operator can make the first slider 503 and the second slider 505 easily hold the frame F in a state where a rear side (right temple FTR and left temple FTL) of the frame F is oriented toward the measuring unit 100, while holding the frame F. According to this configuration of the frame holding unit 500, size-reduction of the frame holding unit 500 can be promoted. The support column member 510 which is included in the guide mechanism 508 is disposed at the middle in the left-right direction, and the width of the support column member 510 in the left-right direction is set to be equal to or less than the left-right width of the bridge FB of the frame F, and thus, when measurement is carried out by using the measuring unit 100 described below, the measurement can be carried out while avoiding interference with a tracing stylus 110 and a tracing stylus shaft 112.

A detailed configuration of the measuring unit 100 will be described with reference to FIGS. 1 and 6 to 9. A main mechanism of the measuring unit 100 is disposed in the main body base 10 and positioned on a rear side (side where the eyes of a wearer are located) of the eyeglass frame F held by the frame holding unit 500.

The measuring unit 100 includes the tracing stylus 110, the tracing stylus shaft 112, a tracing stylus moving unit 108, a rotating unit 200 and a front-rear moving unit 300. The tracing stylus 110 is inserted into a groove (not shown) of the rims (FL, FR) of the eyeglass frame F. The tracing stylus 110 is attached to the tip of the tracing stylus shaft 112. The tracing stylus moving unit 108 is configured to move the tracing stylus 110 in a radial direction. The tracing stylus moving unit 108 moves the tracing stylus 110 in a direction to be away from the vicinity of a rotation axis Z1and in a direction to be close to the vicinity of the rotation axis Z1. The rotating unit 200 is configured to rotate the tracing stylus moving unit 108 about the rotation axis Z1 which is set to pass through the inside of the contour of the rim such that the tip 110a of the tracing stylus 110 traces the rim along the contour of the rim, and the rotating unit 200 is disposed on a rear side of the frame F which is held by the frame holding unit 500. The front-rear moving unit 300 is configured to change a position of the tracing stylus 110 in the front-rear direction such that the tracing stylus 110 traces the rim along the change of the rim in the front-rear direction (front-rear direction in which the rotation axis Z1 extends, in this illustrative embodiment) of the frame. The front-rear moving unit 300 in this illustrative embodiment is configured to move the rotating unit 200 in a direction of the rotation axis Z1.

The tracing stylus moving unit 108 in this illustrative embodiment includes a turning unit 120 which causes the tracing stylus shaft 112 to turn in the radial direction of the rim about a turning axis A1 which is set non-parallel to the rotation axis Z1 such that the tip of the tracing stylus 100 is tiltable on the rear side of the frame F. The tracing stylus moving unit 108 may be configured to linearly move parallel to a plane perpendicular to the rotation axis Z1 (measurement reference surface 81), without being limited to the configuration of the turning unit 120.

The measuring unit 100 includes a left-right moving unit 400 which moves the rotating unit 200 and the like between a first measurement position where the right rim FR of the frame F held by the frame holding unit 500 is measured and a second measurement position where the left rim FL on the other side thereof is measured.

Figure 6:
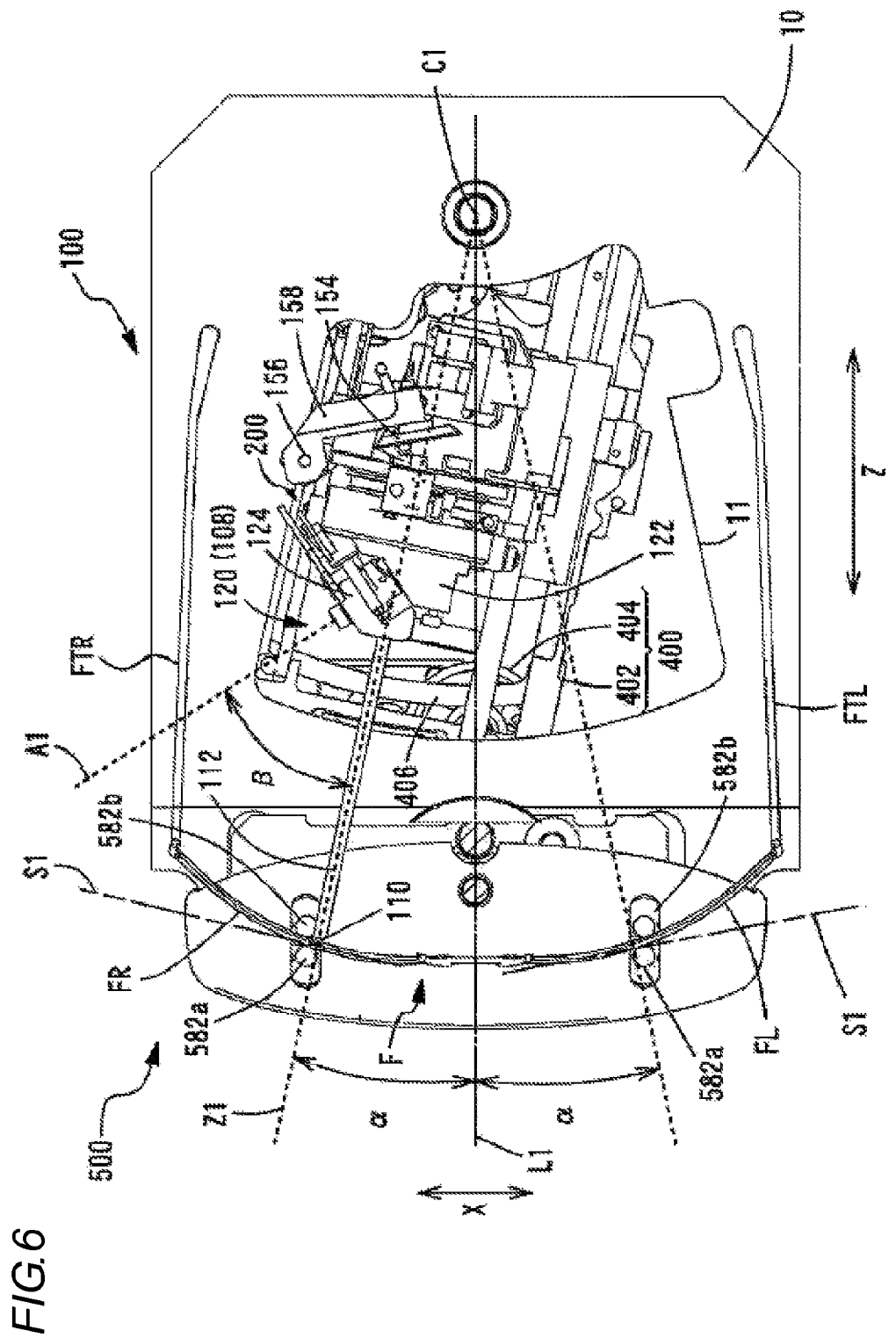
FIG. 6 is a top view of a measuring unit.

FIG. 6 is a top view of the measuring unit 100. An opening 11 is formed in the main body base 10. An arc movement base 402 in which the rotating unit 200 and the like are mounted is disposed under the main body base 10. The rotating unit 200 and the like mounted on the arc movement base 402 are exposed upward through the opening 11. The left-right moving unit 400 includes the arc movement base 402, a motor 404 and the like. The arc movement base 402 is held by the main body base 10 to be movable in an arc about an axis C1 (longitudinal axis) which is set in the rear of the main body base 10. The axis C1 is positioned on a rear side of the eyeglass frame F which is held by the frame holding unit 500, and the axis C1 extends in the longitudinal direction (Y-direction) of the eyeglass frame F. In this illustrative embodiment, the axis C1 is set in a position of a center line L1 extending in the front-rear direction and passing through the center of the frame holding unit 500 in the left-right direction. Accordingly, in the arc movement base 402, the front side of the arc movement base 402 (side where the frame holding unit 500 is positioned) is movable in the left-right direction about the axis C1.

Figure 7:
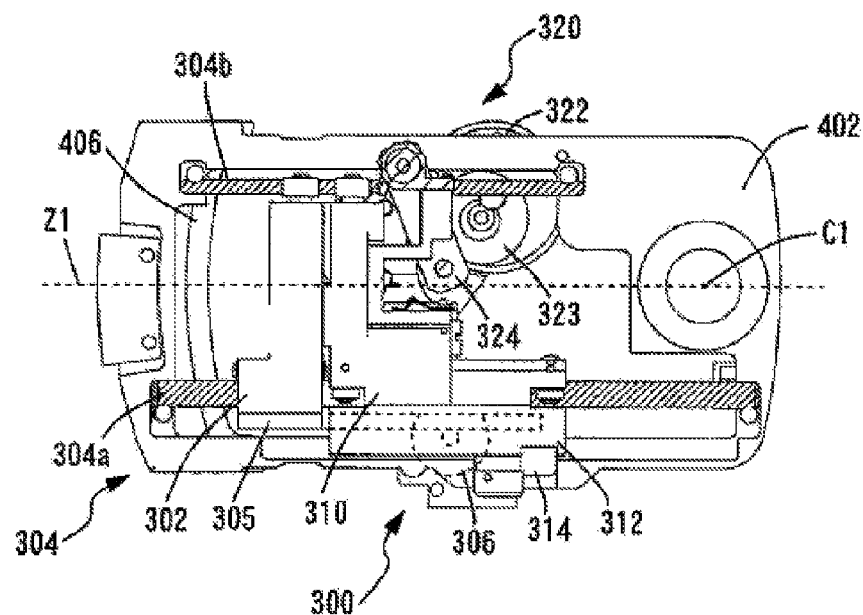
FIG. 7 is a top view of an arc movement base.

FIG. 7 is a top view of the arc movement base 402 in a state where the main body base 10 is omitted. A rack 406 having the axis C1 as the center in the same radius is fixed to a front portion of the arc movement base 402. The rack 406 engages with a gear of the motor 404 which is fixed to the main body base 10. Therefore, when the motor 404 is driven, the arc movement base 402 rotationally moves in arc shape (rotates) about the axis C1 via a rotation transmission mechanism such as the rack 406. Accordingly, the rotation axis Z1 of the rotating unit 200 is rotated in the left-right direction with respect to the center line L1. In accordance with the arc movement of the arc movement base 402, the position of the rotation axis Z1 of the rotating unit 200 is switched (moved) between the first measurement position for measuring the right rim FR and the second measurement position for measuring the left rim FL. The first measurement position is a position where the rotation axis Z1 tilts by an angle α on the right rim FR side with respect to the center line L1. The second measurement position is a position where the rotation axis Z1 tilts by an angle α on the left rim FL side with respect to the center line L1. The angle α is set as an angle in which a distance of the rotation axis Z1 with respect to the center line L1 on the front side is greater than that on the rear side. The angle α is set to 12 degrees, for example. In other words, when the rotating unit 200 is positioned in each of the first measurement position and the second measurement position, the rotation axes Z1 respectively tilt by predetermined angles α with respect to the center line L1. Therefore, the measurement reference surface S1 is set to tilt rearward on the temple side of the frame F with respect to the center in the left-right direction (X-direction). Accordingly, in particular, when the eyeglass frame F has a high-curve frame, the tracing stylus 110 easily traces along the rim, and the tracing stylus 110 is unlikely to deviate from the rim. Even when the rotating unit 200 moves to the first measurement position and the second measurement position by the left-right moving unit 400, the rotating unit 200 is positioned between the right temple FTR and the left temple FTL of the frame F.

Incidentally, as long as the measuring mechanism such as the rotating unit 200 is positioned between the right temple FTR and the left temple FTL of the eyeglass frame F held by the frame holding unit 500 when the measuring mechanism such as the rotating unit 200 moves from the first measurement position to the second measurement position, the configuration is not limited to this illustrative embodiment. The left-right moving unit 400 may be configured to move the rotating unit 200 (base 402) to be parallel (linearly) in the left-right direction. However, in a configuration where the rotating unit 200 and the like are disposed on the rear side of the frame F, when measuring the high-curve frame, it is advantageous to employ a configuration in which the rotation axis Z1 of the rotating unit 200 rotationally tilts about the axis C1 with respect to the center line L1. In such a configuration, even though the tracing stylus moving unit 108 is configured to linearly move in parallel to the plane perpendicular to the rotation axis Z1, the high-curve frame can be preferably measured.

In FIG. 7, the front-rear moving unit 300 is disposed in the arc movement base 402. The front-rear moving unit 300 is configured as follows. The front-rear moving unit 300 includes a guide mechanism 304 which guides the rotating unit 200 to be movable in the direction of the rotation axis Z1. In FIG. 7, for example, the guide mechanism 304 has guide shafts 304a and 304b extending parallel to the rotation axis Z1. The front-rear movement block 302 is mounted to be movable along the guide shafts 304a and 304b. A rack 305 extending parallel to the guide shaft 304a is fixed to the front-rear movement block 302. A motor 306 is fixed to the arc movement base 402. A gear attached to a rotation axis of the motor 306 engages with the rack 305. Therefore, as the motor 306 rotates, the front-rear movement block 302 moves in a direction of the axis Z1.

The rotating unit 200 is mounted on a front-rear movement base 310 which is mounted to be movable along the guide shafts 304a and 304b. A sensor plate 312 is attached to the front-rear movement base 310. A sensor 314 which detects an indicator disposed in the sensor plate 312 is fixed to the arc movement base 402. The sensor 314 detects a movement position of the front-rear movement base 310 in the direction of the rotation axis Z1 by detecting the indicator in the sensor plate 312. In other words, a movement position of the tracing stylus 110 in the direction of the rotation axis Z1 is detected through the sensor 314.

A connection mechanism 320 having a motor 322 which connects the front-rear movement base 310 and the front-rear movement block 302 with each other is attached to the front-rear movement block 302 via an attachment plate (not shown). The connection mechanism 320 has an eccentric cam 323, a movement arm 324, a stopper member (not shown) and the like. The eccentric cam 323 and the movement arm 324 rotate in accordance with the rotation of the motor 322, and a stopper member presses the front-rear movement base 310 toward the front-rear movement block 302 such that the front-rear movement base 310 is connected to the front-rear movement block 302. Accordingly, the front-rear movement base 310 moves integrally with the front-rear movement block 302 in the direction of the rotation axis Z1 in accordance with driving of the motor 306. The rotating unit 200 mounted on the front-rear movement base 310 moves between a retraction position set on the rear side (axis C1 side) and an initial position at which measurement starts and which is set on the front side (frame holding unit 500 side).

In the measurement start position, after the connection mechanism 320 is released in accordance with driving of the motor 322, the front-rear movement block 302 moves to a standby position on the further front side in accordance with the driving of the motor 306. Accordingly, the front-rear movement base 310 and the rotating unit 200 can freely move forward and rearward. Incidentally, the front-rear moving unit 300 may employ a configuration in which the tracing stylus shaft 112 extends and retracts, a configuration in which the tracing stylus shaft 112 moves in the direction of the rotation axis Z1 with respect to the rotating unit 200, or the like.

Figure 8:
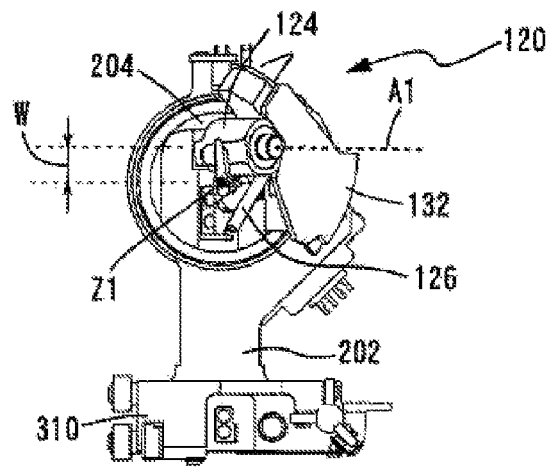
FIG. 8 is a front view of a rotating unit and a turning unit when viewed in a rotation axis Z1.
Figure 9:
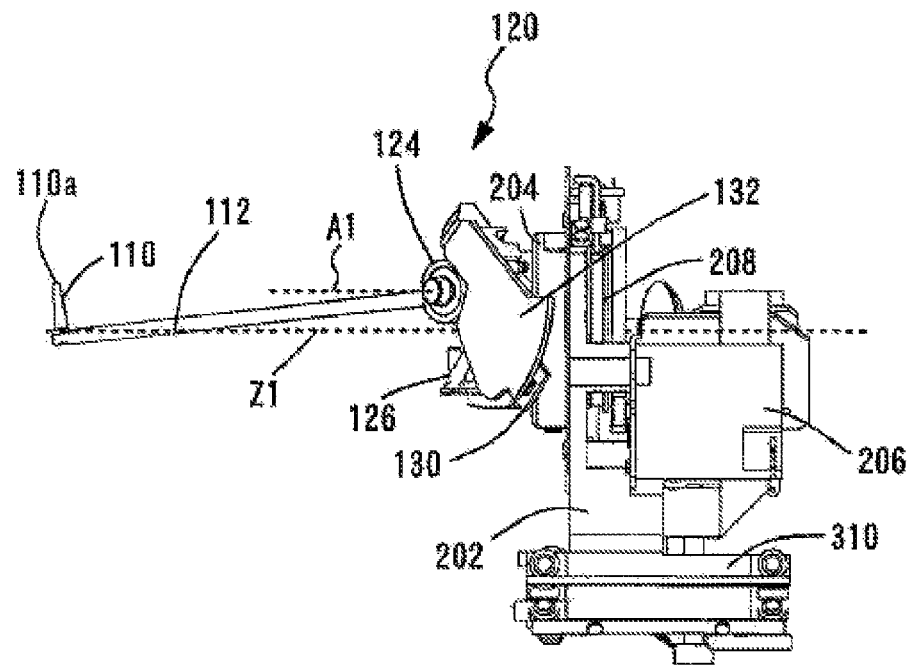
FIG. 9 is a side view of the rotating unit and the turning unit.

FIG. 8 is a front view of the rotating unit 200 and the turning unit 120 when viewed in the rotation axis Z1. FIG. 9 is a side view of the rotating unit 200 and the turning unit 120.

A configuration of the rotating unit 200 will be described. In FIGS. 1, 8 and 9, a holding block 202 is fixed onto the front-rear movement base 310. A rotation base 204 is held by the holding block 202 to be rotatable about the rotation axis Z1. The rotation base 204 rotates around the rotation axis Z1 via a rotation transmission mechanism 208 including a gear and the like, by a motor 206 fixed to the holding block 202.

A configuration example of the turning unit 120 will be described. In FIGS. 1, 6, 8 and 9, the turning unit 120 is mounted on the rotation base 204. A tracing stylus shaft support member 124 is held by a block 122 on the rotation base 204 to be rotatable about the turning axis A1. A base portion of the tracing stylus shaft 112 is attached to the tracing stylus shaft support member 124. Accordingly, when the tracing stylus shaft 112 turns about the turning axis A1, the tracing stylus 110 moves in the radial direction from the rotation axis Z1 in an arc motion. That is, the tracing stylus 110 is configured to be tiltable toward the rear side. A biasing force is applied to the support member 124 at all times through a spring (biasing member) 126 (an example of measurement pressure applying means) such that the tip of the tracing stylus 110 rotates in a direction to be away from the rotation axis Z1. In this case, it is preferable to provide a gravity center of the turning unit 120 including the tracing stylus shaft 112 on the turning axis A1. In this manner, it is possible to reduce influence of a turning angle and to maintain a measurement pressure to be substantially constant.

The turning axis A1 may be a first direction perpendicular to the rotation axis Z1. However, preferably, the turning axis A1 is set to tilt by a certain angle 13 (refer to FIG. 6) with respect to the rotation axis Z1 so as to extend in a third direction between the first direction which is perpendicular to the rotation axis Z1 and a second direction which is an axial direction of the rotation axis Z1. In other words, preferably, the angle β in the third direction is greater than zero degree and less than 90 degrees. More preferably, the third direction in which the turning axis A1 extends is set in the middle (for example, angle β is 40 degrees to 50 degrees) between the first direction which is perpendicular to the rotation axis Z1 and the second direction which is parallel to the rotation axis Z1. In this illustrative embodiment, the angle β is set to 45 degrees. The turning axis A1 tilts by the angle β with respect to the rotation axis Z1, a tilt angle of the tracing stylus 110 in a tip direction with respect to the measurement reference surface S1 perpendicular to the rotation axis Z1 becomes larger as the tip of the tracing stylus 110 separates further away from the rotation axis Z1. Particularly, tilt of the turning axis A1 is advantageous when the tracing stylus 110 traces the rims in the vicinity of the temples (FTR, FTL) of the high-curve frame. In the apparatus of this illustrative embodiment, the rotating unit 200 and the turning unit 120 are disposed on the rear side of the eyeglass frame. In the configuration, even in a case of the high-curve frame, the tracing stylus 110 is unlikely to deviate from the rim of the high-curve frame, and thus, the contour of the rim can be smoothly traced.

A reference position of the reference surface S1 is set to be a predetermined position (for example, a position in which the reference surface S1 passes through the middle of the front pins 582a and 582b on the second slider 505 side) of the frame holding unit 500. In this illustrative embodiment, since the rotation axis Z1 tilts by the angle α in each of the first measurement position where the right rim FR is measured and the second measurement position where the left rim FL is measured, while interposing the center line L1 therebetween, the reference surface S1 where the right rim FR is measured and another reference surface S1 where the left rim FL is measured respectively tilt by the angles α with respect the left-right direction.

Figure 10:
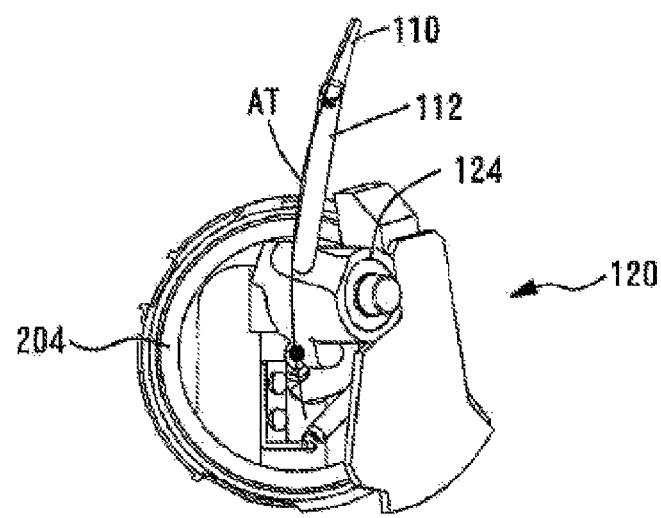
FIG. 10 is a view showing an arc locus along which the tip of a tracing stylus moves.

The turning axis A1 tilts by the angle β (an angle which is not the first direction perpendicular to the rotation axis Z1) with respect to the rotation axis Z1, and thus, when seen from the direction of the rotation axis Z1, as shown in FIG. 10, a locus in which the tip of the tracing stylus 110 moves becomes an arc locus AT. Accordingly, in a case where a radius vector of the rim changes in a direction to be elongated, followability of the tracing stylus 110 is improved, and thus, the rim can be precisely measured.

A sensor plate 132 is attached to the tracing stylus shaft support member 124. A sensor 130 which detects an indicator formed in the sensor plate 132 is attached to the block 122. The sensor 130 detects a rotation position of the sensor plate 132, thereby detecting the rotation of the tracing stylus shaft support member 124. In other words, a state of turning about the turning axis A1 of the tracing stylus shaft 112 (tracing stylus 110) is detected by the sensor 130. The initial position of the tracing stylus 110 at the time of starting of the measurement is set such that the tip of the tracing stylus 110 is positioned in the vicinity of the rotation axis Z1 (rotation of the support member 124 are regulated).

In the illustrative embodiment, the turning axis A1 does not pass through the rotation axis Z1 (does not intersect the rotation axis Z1) and is away therefrom by only a certain distance W (for example, 10 mm). Accordingly, it is possible to shorten the length of the tracing stylus shaft 112 while extending the measurement range in a radial direction. When the length of the tracing stylus shaft 112 can be shortened, the size of the apparatus can be reduced.

Figure 11A:
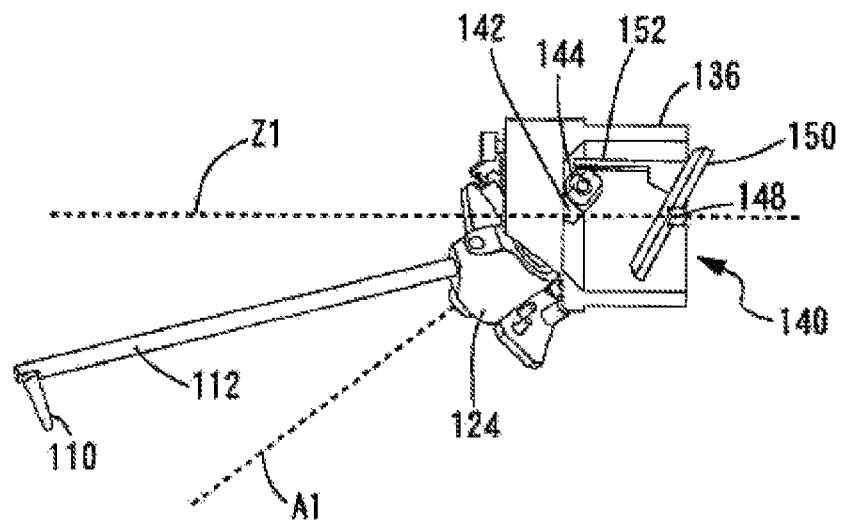
FIG. 11A is a view showing a fixing mechanism which fixes the tracing stylus to an initial position at which measurement starts.
Figure 11B:
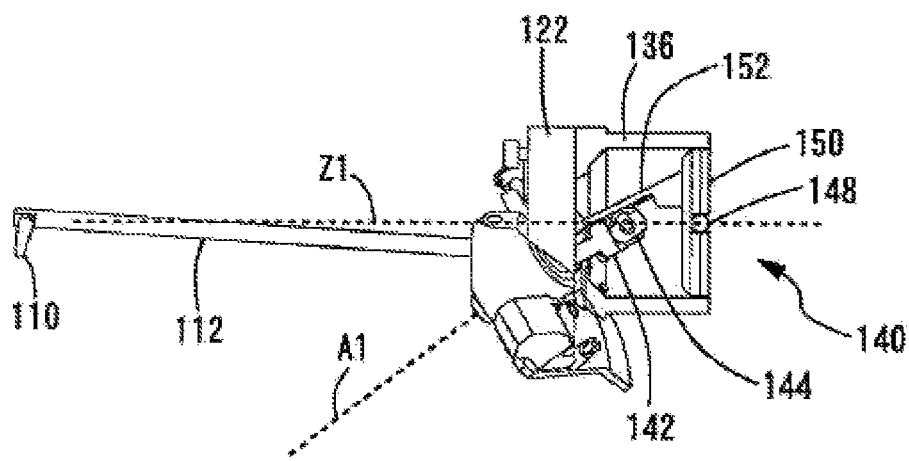
FIG. 11B is another view showing the fixing mechanism which fixes the tracing stylus to the initial position at which measurement starts.

FIGS. 11A and 11B are views showing a fixing mechanism which fixes the tracing stylus 110 to the initial position at which the measurement starts. A biasing force is applied to the tracing stylus shaft 112 through the spring 126 so as to be turned about the turning axis A1. As the measurement starts, turning of the tracing stylus shaft 112 and the support member 124 is fixed by a fixing mechanism 140 described below such that the tracing stylus 110 is positioned in the vicinity of the rotation axis Z1 against the biasing force of the spring 126. FIG. 11A is a view showing a state where the fixed turning is released, and FIG. 11B is a view showing a state where the turning of the tracing stylus shaft 112 and the support member 124 is fixed to the initial position.

In FIGS. 11A and 11B, a roller 144 is disposed in a rod member 142 extending from a rear end side of the support member 124. A cylinder member 136 extending rearward is attached to the block 122 fixed to the rotation base 204 (not shown in FIGS. 11A, 11B). A rotation member 150 is supported by a shaft member 148 to be rotatable in the rear end of the cylinder member 136. An engagement member 152 which engages with the roller 144 is fixed to the rotation member 150.

When a rear surface of the rotation member 150 is pressed by a press-in member 154 shown in FIG. 6 so as to be perpendicular to the rotation axis Z1, the engagement member 152 tilts, as shown in FIG. 11B. As the engagement member 152 tilts, a force for rotating the support member 124 around the turning axis A1 is applied via the roller 144 and the rod member 142. The turning of the support member 124 is regulated in a state of FIG. 11B, and thus, the tracing stylus 110 and the tracing stylus shaft 112 are fixed to the initial position at which the measurement starts.

In FIG. 6, the press-in member 154 is attached to an arm member 158 which is rotatable about a shaft 156. The arm member 158 engages with a movement arm 324 which rotates in accordance with driving of a motor 322 included in the interlocking mechanism 320 shown in FIG. 7, thereby being pressed toward the rotation member 150. The motor 322 of the connection mechanism 320, the eccentric cam 323, the movement arm 324 and the like in FIG. 7 also serve as portions of the fixing mechanism 140. When the motor 322 inversely rotates and the press-in member 154 is away from the rotation member 150, a measurement pressure by which the tracing stylus 110 moves in the radial direction (direction away from the rotation axis Z1) is applied thereto due to the spring 126.

Figure 12:
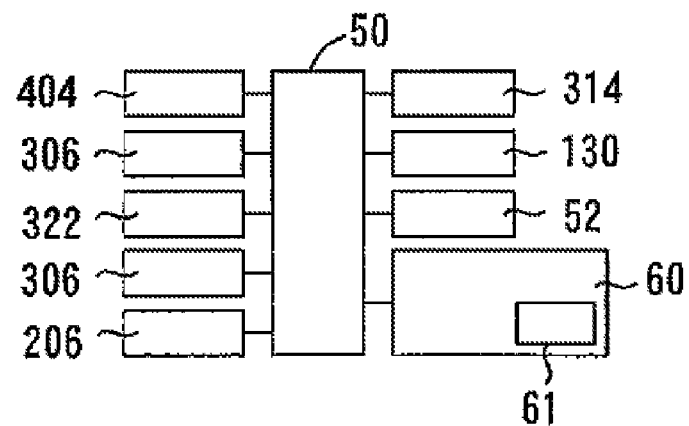
FIG. 12 is a configuration view of an electrical system of the eyeglass frame shape measuring apparatus.

FIG. 12 is a configuration view of an electrical system of the eyeglass frame shape measuring apparatus 1. Each of the motors 404, 322, 306, 206 and each of the sensors 314, 130 are connected to a control unit (controller) 50. The control unit is connected with a memory 52 for storing a measurement result and the like, and a switch panel 60 (an example of an input unit) which includes a switch 61 for inputting a measurement start signal, and the like. The control unit 50 controls driving of each motor, and also serves as calculation means (calculation unit) for calculating a three-dimensional shape of the rim based on an output signal from each sensor.

<Operations>

Operations of the eyeglass frame shape measuring apparatus will be described. An operator sets the frame F to be held by the frame holding unit 500. When the operator lifts the first slider 503 together with the rotation knob 570, the second slider 505 is lowered while being interlocked therewith, thereby forming a space for inserting the right rim FR and the left rim FL of the frame F. The operator sets the frame F to be interposed between the first slider 503 and the second slider 505 such that the rear side (right temple FTR, left temple FTL) is oriented toward the rotating unit 200 of the measuring unit 100. The operator sets the right rim FR and the left rim FL to be positioned between the front pin 582a and the rear pin 582b. When the first slider 503 is lowered by the operator, the second slider 505 rises while being interlocked therewith, and thus, the frame F (right rim FR and left rim FL) is held between a facing surface of the first slider 503 and a facing surface of the second slider 505. Thereafter, the operator rotates the rotation knob 570, and the clamping mechanisms 580A and 580B are operated to clamp the right rim FR and the left rim FL by the front pins 582*a* and the rear pins 582*b* which are disposed at four locations. Accordingly, the frame F is held in a measurable state. In FIGS. 1 and 6 of this illustrative embodiment, the lower ends (when worn) of the right and left rims are shown so as to abut on the second slider 505. However, another method may be employed in which the frame is set to be turned upside down in the longitudinal direction such that the lower ends of the right and left rims abuts on the first slider 503.

The support column member 510 (an example of a guide mechanism) which guides the first slider 503 and the second slider 505 to be movable in the longitudinal direction is disposed in the vicinity of the middle portion in the left-right direction on a rear side of the frame F. The frame holding unit 500 has a configuration in which the guide mechanism which guides the first slider 503 and the second slider 505 to be movable in the longitudinal direction is not provided on both the right and left sides of the first slider 503 and the second slider 505. Therefore, even though the frame is the high-curve frame having a wide left-right width, the operator can set the right and left temples FTR and FTL to be positioned on the measuring unit 100 side (rotating unit 200 side) while the frame is neither limited by disposition of the guide mechanism nor interfered by the guide mechanism. Since both the right and left sides of the first slider 503 and the second slider 505 are open, the operator can easily set the right temple FTR and the left temple FTL of the frame F to be positioned on the measuring unit 100 side (rotating unit 200 side). Moreover, since there is no need to provide the guide mechanism on both the right and left sides of the first slider 503 and the second slider 505, the frame holding unit 500 can be made compact, and thus, it is possible to hold a frame F which has a width wider than the left-right widths of the first slider 503 and the second slider 505.

As a measurement start signal is input through the switch panel 60, the measurement starts. The switch panel 60 can receive a measurement start signal for consecutively measuring the right and left rims and a measurement start signal for selectively measuring the right and left rims. For example, a measurement start signal for consecutively measuring the right and left rims is input by the switch 61. In the consecutive measurement of the right and left rims, for example, the measurement is set to start from the right rim FR. The control unit 50 controls driving of the motor 404 of the left-right moving unit 400 to rotate the arc movement base 402 about the axis C1, thereby moving the arc movement base 402 to a position set for measuring the right rim FR. In this case, the rotation axis Z1 of the rotating unit 200 is set to a position tilting at the angle α (12 degrees) with respect to the center line L1 in the left-right direction (X-direction). The rotation axis Z1 becomes a position inside the rim which is held by the frame holding unit 500. The reference surface for measuring a radius vector in the three-dimensional shape measurement of the rim is the reference surface S1 (refer to FIG. 6) perpendicular to the rotation axis Z1. A reference position of the reference surface S1 in the direction of the rotation axis Z1 is a predetermined position of the frame holding unit 500 (for example, a position where the reference surface S1 passes through the middle of the front pin 582*a* and the rear pin 582*b* on the second slider 505 side).

The control unit 50 controls driving of the motor 306 of the front-rear moving unit 300 and moves the front-rear movement block 302 and the front-rear movement base 310 to the front side (frame F side), thereby moving the rotating unit 200 and the tracing stylus 110 and the like which are located at the retraction position to the initial position at which the measurement starts. In the initial position at which the measurement starts, the tracing stylus 110 is set in the middle position between the front pin 582*a* and the rear pin 582*b* on an upper side of the right rim.

Subsequently, the control unit 50 drives the motor 322 of the connection mechanism 320 and releases fixing of the turning of the tracing stylus shaft 112 by the fixing mechanism 140. When the fixing of the turning of the tracing stylus shaft 112 is released, the tracing stylus shaft 112 turns about the turning axis A1 by the spring 126, and the tip of the tracing stylus 110 moves in a direction away from the rotation axis Z1 (direction toward the groove of the rim). The turning angle of the tracing stylus shaft 112 is detected by the sensor 130. When the tip of the tracing stylus 110 is inserted into the groove of the rim, the tracing stylus shaft 112 stops turning. Therefore, the control unit 50 detects that the tip of the tracing stylus 110 is inserted into the groove of the rim, based on an output signal of the sensor 130. In response to the detected result thereof, the control unit 50 further drives the motor 322 and releases connection by the connection mechanism 320. Thereafter, the control unit 50 drives the motor 306 of the front-rear moving unit 300, and moves the front-rear movement block 302 to the standby position on the front side (frame F side). Accordingly, the front-rear movement base 310 and the rotating unit 200 can freely move forward and rearward in the direction of the rotation axis Z1.

Subsequently, in order to trace the rim, the control unit 50 drives the motor 206 of the rotating unit 200, and rotates the rotation base 204 around the rotation axis Z1. The turning unit 120 (the tracing stylus moving unit 108) rotates around the rotation axis Z1 together with the tracing stylus shaft 112 and the tracing stylus 110 in accordance with the rotation of the rotation base 204. Accordingly, the tracing stylus 110 moves in a circumferential direction of the rim. In other words, the contour of the rim is traced by the tracing stylus 110. In this case, a measurement pressure is applied to the tip of the tracing stylus 110 by the spring 126 so as to be oriented toward the rim side, and thus, the tracing stylus shaft 112 (support member 124) turns about the turning axis A1 in accordance with a change of the radius vector of the rim. A turning state of the tracing stylus shaft 112 at this time is detected by the sensor 130. The tracing stylus 110 moves in the front-rear direction (direction of rotation axis Z1) together with the rotating unit 200 (front-rear movement base 310) following the change of the rim in the direction of the rotation axis Z1. The front-rear movement is detected by the sensor 314. The control unit 50 acquires rotation information of the rotating unit 200 (the tracing stylus moving unit 108) based on drive information of the motor 206. Also, the control unit 50 acquires movement information of the tracing stylus 110 in the radial direction based on the detection signal of the sensor 130. That is, the control unit 50 acquires a radius vector rn of the rim from the reference position (position of rotation axis Z1) for each rotation angle of the rotation base 204 based on the detection signal of the sensor 130. The radius vector rn in a certain rotation angle (θn) of the rotation base 204 is mathematically calculated based on the turning angle of the tracing stylus shaft 112, a distance from the turning center to the tip of the tracing stylus 110 (this is already known), and the like. The control unit 50 acquires movement information of the tracing stylus 110 in the front-rear direction based on the detection signal of the sensor 314. That is, the control unit 50 acquires a position (zn) of the rim in the direction of the rotation axis Z1 for each of the rotation angle (θn) of the rotation base Z1 based on the detection signal of the sensor 314. Then, the control unit 50 can acquire tracing data of the rim based on the rotation information of the rotating unit 200, the movement information of the tracing stylus 110 in the radial direction and the movement information of the tracing stylus 110 in the front-rear direction. Three-dimensional shape data (rn, zn, θn) (n=1, 2, 3, . . . , and N) of the overall circumference of the rim can be acquired by rotating the rotation base 204 once. The measurement result (tracing result) is stored in the memory 52.

Figure 13:
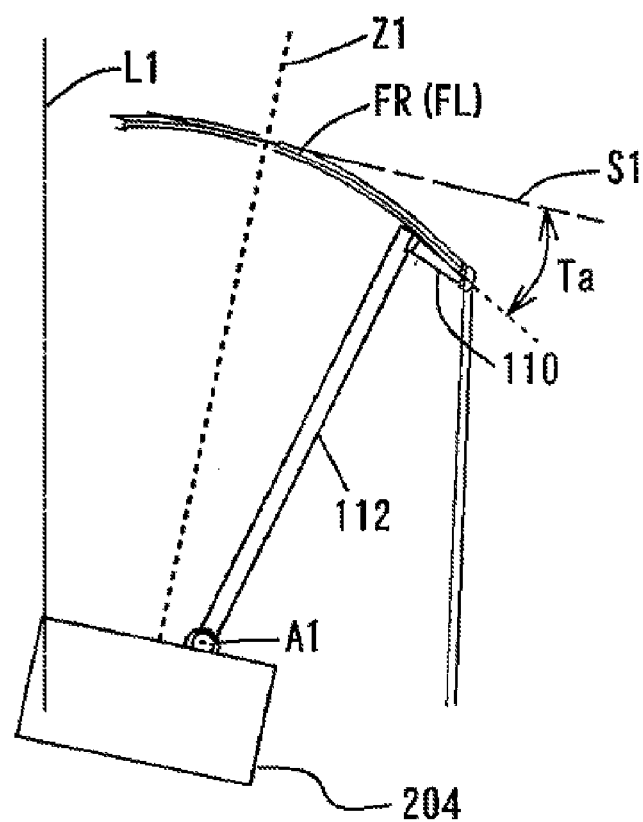
FIG. 13 is a view showing a measurement state in which a tilt angle Ta of the tip of the tracing stylus with respect to a reference surface S1 becomes large.

The movement of the tracing stylus shaft 112 is carried out by not a mechanism for linearly moving in a radius vector direction but is carried out by turning about the turning axis A1. Therefore, as in FIG. 13, a tilt angle Ta of the tip of the tracing stylus 110 with respect to the reference surface S1 (surface perpendicular to rotation axis Z1) becomes greater as the tracing stylus 110 becomes further away from the rotation axis Z1 (radius vector rn becomes longer). Particularly, a curve at an ear side portion (vicinity of the temple) of the high-curve frame tends to be sharp. However, since the tilt angle Ta becomes larger as the radius vector rn becomes longer, the tracing stylus 110 tends to easily trace the rim of the high-curve frame and is unlikely to deviate from the groove of the rim. Therefore, the high-curve frame can be stably measured.

Further, by disposing the rotation axis Z1 and the turning axis A1 in the above-described manner, the size of the rotating unit 200 and the like can be reduced. For example, compared to a case where the rotation axis Z1 extends in the same direction as the center line L1 in the left-right direction while the turning axis A1 extends in the direction perpendicular to the rotation axis Z1 (first direction), the measurable range for the radius vector can be widened without lengthening the tracing stylus shaft 112. Regarding a configuration in which the turning axis A1 extends in the direction perpendicular to the rotation axis Z1, if the length of the tracing stylus shaft 112 is too short, the measurable range for the radius vector is narrowed in accordance therewith and the tilt angle Ta of the tracing stylus 110 becomes greater as the radius vector becomes longer. In comparison, in the this illustrative embodiment, the rotation axis Z1 tilts with respect to the center line L1, and the turning axis A1 tilts with respect to the rotation axis Z1, and thus, it is possible to measure the high-curve frame while reducing the length of the tracing stylus shaft.

Meanwhile, if the turning axis A1 is in the same direction as the rotation axis Z1 (second direction), the tracing stylus 110 does not tilt and only move in the arc movement. The maximum distance of the arc movement is proportional to the distance W between the rotation axis Z1 and the turning axis A1. In order to support (measure) a frame of which a radius vector is long such as the high-curve frame, the distance W needs to be lengthened, thereby causing the rotating unit 200 (rotation base 204 and the like) to be increased in size. In contrast, in the apparatus according to this illustrative embodiment, the size of the rotating unit 200 can be reduced by disposing the turning axis A1 in the above-described manner. When the angle of the turning axis A1 ranges from 40 degree to 50 degree (45 degree in this illustrative embodiment), it is possible to support the high-curve frame having 8 curve, and thus, the measurement can be smoothly carried out.

Figure 14:
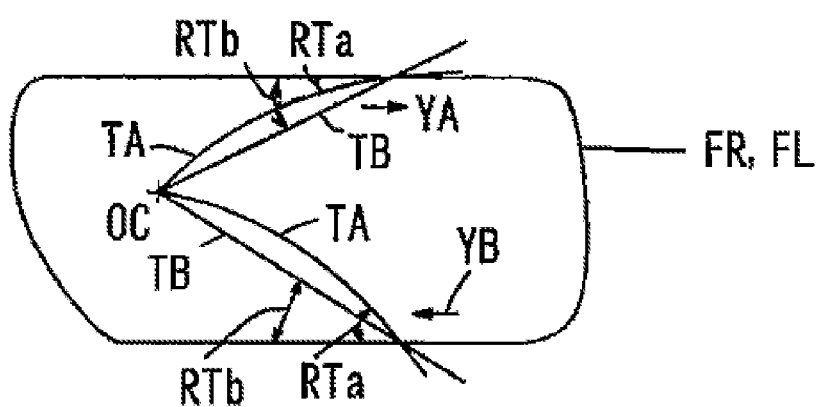
FIG. 14 is a view showing advantages when the tip of the tracing stylus moves in the arc locus with respect to the rim.

In the apparatus according to this illustrative embodiment, since the turning axis A1 is not set in the first direction which is perpendicular to the rotation axis Z1, but in a tilt direction between the second direction and the first direction of the rotation axis Z1, a movement locus of the tracing stylus 110 which is seen from the direction of the rotation axis Z1 is considered to be a locus TA of the arc movement as in FIGS. 10 and 14. As in FIG. 14, in a case where the rim changes in the arrow YA direction in which the radius vector rn becomes longer with respect to the center point OC in the rim (FR, FL), when an angle RTa of the tracing stylus 110 with respect to a changing direction of the radius vector rn is smaller, the followability of the tracing stylus 110 at the time of tracing becomes better. Meanwhile, in a case where the rim changes in the arrow YB direction in which the radius vector rn becomes shorter, when the angle RTa of the tracing stylus 110 with respect to the changing direction of the radius vector rn is greater, the followability of the tracing stylus 110 at the time of the tracing becomes better. In the apparatus, the movement locus of the tracing stylus 110 is the locus TA of the arc movement. When the tracing is carried out as the rim changes in the arrow YA direction in which the radius vector rn becomes longer, the angle RTa becomes smaller with respect to an angle RTb (angle formed by a linear movement direction TB and the changing direction of the rim) in the linear movement direction TB, and thus, the followability of the tracing stylus 110 becomes better than that in the linear movement method. Meanwhile, when the tracing is carried out as the rim changes in the arrow YB direction, the angle RTa becomes larger with respect to the angle RTb in the linear movement direction TB, and thus, the followability of the tracing stylus 110 becomes better than that in the linear movement method.

As described above, since the turning axis A1 is in the tilted state, the apparatus according to this illustrative embodiment exhibits two operations as follows. The tip of the tracing stylus 110 with respect to the reference surface S1 is able to tilt on the rear side of the frame F, and the tracing stylus 110 moves along the arc locus TA. Thus, the rim of the high-curve frame can be smoothly traced.

As the measurement of the right rim FR is finished, the motor 322 is driven by the control unit 50, and the turning state of the tracing stylus shaft 112 returns to the initial state by the fixing mechanism 140. Thereafter, the connection mechanism 320 is driven, and the rotating unit 200 returns to the retraction position on the rear. Subsequently, in order to carry out the measurement for the other side, the left rim FL, the control unit 50 controls the driving of the motor 404 of the left-right moving unit 400 and rotates the arc movement base 402 about the axis C1, thereby moving the arc movement base 402 to a position set for measuring the left rim FL. The measurement position of the left rim FL is set to a position where the rotation axis Z1 of the rotating unit 200 tilts by the angle α (12 degrees) with respect to the center line L1. Thereafter, the same tracing operation is carried out as the case of the right rim FR, thereby measuring the three dimensional shape data (rn, zn, θn) (n=1, 2, 3, . . . , and N) of the left rim FL. The measurement result of the left rim FL is stored in the memory 52.

In this illustrative embodiment, the rotation axis Z1 is measured in a state of being tilted at the angle α with respect to the center line L1, and the measurement reference surfaces S1 of the right rim FR and the left rim FL respectively tilt by the angles α with respect to the surfaces perpendicular to the center line L1. When the three-dimensional shapes of the right rim FR and the left rim FL are made to be applied with the same reference (surface perpendicular to the center line L1) as in the related-art apparatus, data for the shapes of the right rim FR and the left rim FL which are stored in the memory 52 may be respectively corrected at the angle α. Accordingly, in calculating the frame curve, a geometric center-to-center distance of the right rim FR and the left rim FL, and the like, a measurement result having consistency with the related-art apparatus can be obtained.

Figure 15:
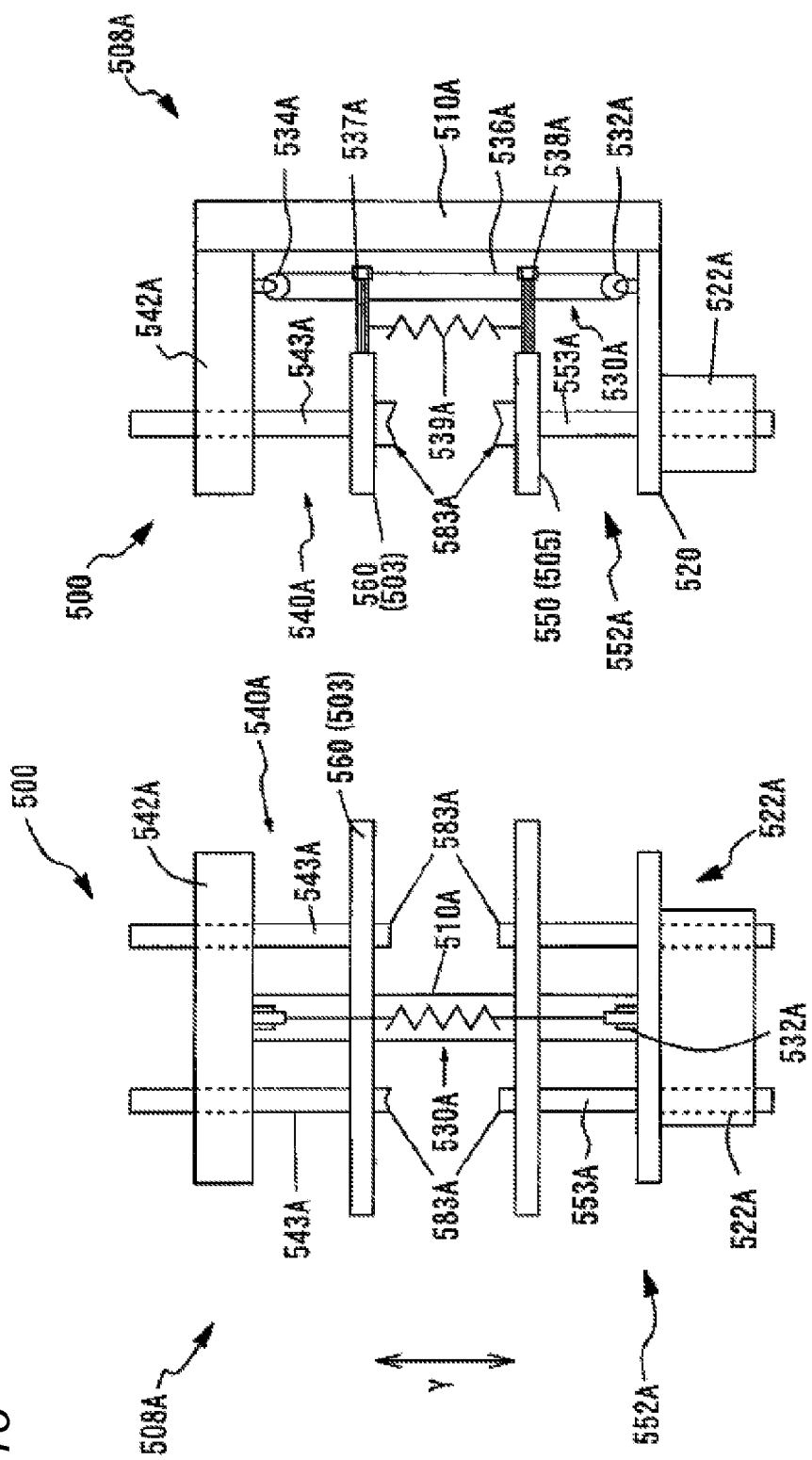
FIG. 15 is a schematic view of a frame holding unit according to a first modified illustrative embodiment.

FIG. 15 is schematic configuration view of the frame holding unit 500 according to a first modified illustrative embodiment. The drawing on the left in FIG. 15 is a front view of the frame holding unit 500. The drawing on the right in FIG. 15 is a side view of the frame holding unit 500. The same reference numerals and signs are applied to the corresponding members of the frame holding unit 500 in FIGS. 1 to 4.

A guide mechanism 508A in this modified illustrative embodiment guides the first slider 503 and the second slider 505 to be movable in the longitudinal direction. The guide mechanism 508A includes a support mechanism 540A which supports the first slider 503 to be movable in the longitudinal direction, a support mechanism 552A which supports the second slider 505 to be movable in the longitudinal direction, and a support column member 510A which holds the support mechanism 540A and the support mechanism 552A.

In FIG. 15, the slide plate 550 included in the second slider 505 is held by the support mechanism 522A to be movable in the longitudinal direction (Y-direction). The support mechanism 552A includes the fixing base 520, two shafts 553A attached to lower portions of the slide plate 550, and a block 522A which holds the two shafts 553A to be movable in the longitudinal direction and is attached to the fixing base 520. The support mechanism 552A is held by the support mechanism 552A allowing the slide plate 560 which is included in the first slider 503 to be movable in the longitudinal direction (Y-direction).

The slide plate 560 included in the first slide 503 is held by the support mechanism 540A to be movable in the longitudinal direction (Y-direction). The support mechanism 540A is a mechanism which is basically identical with the support mechanism 552A, and includes two shafts 543A attached to an upper portion of the slide plate 560, and a block 542A holding the two shafts 543A to be movable in the longitudinal direction. The support mechanism 552A (fixing base 520) and the support mechanism 540A (block 542A) are fixed to the support column member 510A. In this modified illustrative embodiment, the guide mechanism which guides the first slide 503 and the second slide 505 to be movable in the longitudinal direction include the support mechanism 552A (fixing base 520), the support mechanism 540A (block 542A) and the support column member 510A.

The support column member 510A is disposed in the middle portion in the left-right direction (X-direction in FIG. 1) at between the first slide 503 and the second slide 505, in the same manner as the support column member 510 in FIG. 1 and the like. The support column member 510A is disposed on the rear side from the bridge FB of the frame F held by the first slider 503 and the second slider 505. A width of the support column member 510A in the left-right direction is set equal to or less than the left-right width of the bridge FB of the frame F.

An interlocking mechanism 530A through which the first slide 503 and the second slide 505 are interlocked to move in the direction in which the gap between the first slider 503 and the second slider 505 is widened as well as in the direction in which the gap therebetween is narrowed has a following configuration. A pulley 532A is attached to the fixing base 520. A pulley 534A is attached to the block 542A as well. A wire 536A is wound around the pulleys 532A and 534A. The pulleys 532A and 534A, and the wire 536A are disposed in the middle in the left-right direction, in the same manner as the support column member 510A. A rear side of the wire 536A is connected to a connection end 537A extending from the slide plate 560. A front side of the wire 536A is connected to a connection end 538A extending from the slide plate 550. A spring 539A is connected to a portion between the slide plate 560 and the slide plate 550. The spring 593A applies a biasing force in the direction in which the gap between the first slider 503 (slide plate 560) and the second slider 505 (slide plate 550) is narrowed. For example, when the first slide 503 moves in the direction away from the second slide 505 by such a interlocking mechanism 530A, the connection end 537A moves upward, and the connection end 538A pulled by the wire 536A moves downward. Accordingly, the second slide 505 also moves in the direction away from the first slider 503 while being interlocked with the movement of the first slide 503.

In this modified illustrative embodiment of FIG. 15, as a mechanism which fixes the front-left direction of the right and left rims, abutment members 583A having V-shaped grooves are respectively disposed in the slide plate 560 and the slide plate 550.

Figure 16:
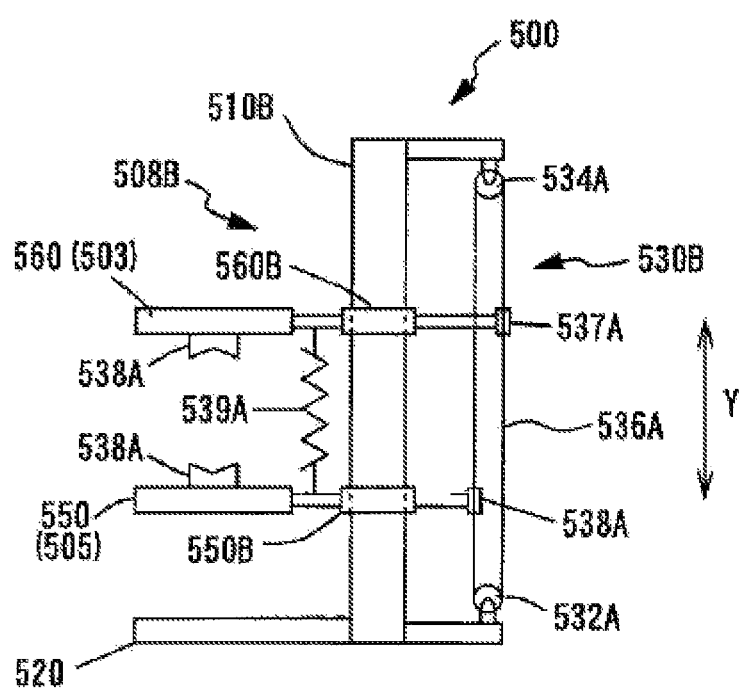
FIG. 16 is a schematic view of a frame holding unit according to a second modified illustrative embodiment.

FIG. 16 is a schematic configuration view of the frame holding unit 500 according to a second modified illustrative embodiment. In FIG. 16, only a side view of the frame holding unit 500 is shown. In FIG. 16, the same reference numerals and signs are applied to the same types of elements in FIG. 15, and description thereof will be omitted.

The modified illustrative embodiment has a guide mechanism 508B which guides at least either one of the first slide 503 or the second slide 505 to be movable in the longitudinal direction. The guide mechanism 508B in FIG. 16 includes a support column member 510B which supports both the first slide 503 and the second slide 505 to be movable in the longitudinal direction.

In FIG. 16, the support column member 510B extending in the longitudinal direction is connected to the fixing base 520. A support block 560B, an example of the support mechanism is attached to the first slider 503 (slide plate 560). The first slider 503 is supported by the support column member 510B to be movable in the longitudinal direction by the support block 560B. Similarly, a support block 550B (an example of the support mechanism) is attached to the second slider 505 (slide plate 550), and the second slider 505 is supported by the support column member 510B to be movable in the longitudinal direction by the support block 550B.

As described above, in the second modified illustrative embodiment of FIG. 16, the guide mechanism 508B which guides the first slider 503 and the second slider 505 to be movable in the longitudinal direction includes the support block 550B, the support block 560B and the support column member 510B.

An interlocking mechanism 530B is the same mechanism as the first modified illustrative embodiment of FIG. 15, and includes the pulley 534A disposed on an upper side of the support column member 510B, the pulley 532A disposed on a lower side of the support column member 510B, the wire 536A, and the connection end 537A which extends from the support block 560B to be connected to the wire 536A on the rear side, the connection end 538A which extends from the support block 550B to be connected to the wire 536A on the front side, and the spring 539A connected to a portion between the slide plate 560 and the slide plate 550. The interlocking mechanism 530B causes the first slider 503 and the second slider 505 to be interlocked to move in the direction in which the gap between the first slider 503 and the second slider 505 is widened as well as in the direction in which the gap therebetween is narrowed.

In the second modified illustrative embodiment of FIG. 16 as well, the support column member 510B is disposed in the middle portion in the left-right direction at between the first slider 503 and the second slider 505. The support column member 510B is disposed on the rear side from the bridge FB of the frame F held by the first slider 503 and the second slider 505. A width of the support column member 510B in the left-right direction is set to be equal to or less than the right left-right wise width of the bridge FB of the frame F.

In the modified illustrative embodiment described above, since both the right and left sides of the first slider 503 and the second slider 505 are open outward as a result of disposing the support column members 510A, 510B of the guide mechanisms 505A, 508B, the operator can set the frame F to be easily held by the first slider 503 and the second slider 505 in a state where the rear side (right temple FTR and left temple FTL) of the frame F to be oriented toward the measuring unit 100 side, while holding the frame F.

What is claimed is:

1. An eyeglass frame shape measuring apparatus comprising:
    an eyeglass frame holding unit which is configured to hold an eyeglass frame; and
    a measuring unit which is configured to measure a shape of a rim of the eyeglass frame by tracing a contour of the rim of the eyeglass frame,
    wherein the measuring unit includes:
        a tracing stylus which is inserted into a groove of the rim;
        a tracing stylus moving unit which is configured to move the tracing stylus in a radial direction of the rim; and
        a rotating unit which is configured to rotate the tracing stylus moving unit about a first axis set to pass through an inside of the contour of the rim such that the tip of the tracing stylus traces the rim along the contour of the rim, and which is disposed between a left temple and a right temple of the eyeglass frame held by the eyeglass frame holding unit.

2. The eyeglass frame shape measuring apparatus according to claim 1,
    wherein the measuring unit further includes a tracing stylus shaft to which the tracing stylus is attached, and
    wherein the tracing stylus moving unit includes a turning unit which is configured to turn the tracing stylus shaft in a radial direction of the rim about a second axis which is set non-parallel to the first axis such that the tip of the tracing stylus is tiltable on the rear side of the eyeglass frame.

3. The eyeglass frame shape measuring apparatus according to claim 2,
    wherein the second axis extends in a third direction between a first direction which is perpendicular to the first axis and a second direction which is an axial direction of the first axis.

4. The eyeglass frame shape measuring apparatus according to claim 2,
    wherein the second axis is provided to the rotating unit such that a tilt angle of the tracing stylus with respect to a measurement reference surface set to the eyeglass frame holding unit becomes larger as the tip of the tracing stylus separates further away from the first axis.

5. The eyeglass frame shape measuring apparatus according to claim 1, further comprising:
    a front-rear moving unit configured to change a position of the tracing stylus in a front-rear direction in which the first axis extends, such that the tip of the tracing stylus traces the rim along a change of the rim in the front-rear direction.

6. The eyeglass frame shape measuring apparatus according to claim 5, further comprising:
    a first acquiring unit configured to acquire rotation information of the rotating unit;
    a second acquiring unit configured to acquire movement information of the tracing stylus in the radial direction;
    a third acquiring unit configured to acquire movement information of the tracing stylus in the front-rear direction; and
    a calculating unit configured to calculate tracing data of the rim based on the acquired information of the first acquiring unit, the second acquiring unit and the third acquiring unit.

7. The eyeglass frame shape measuring apparatus according to claim 1, further comprising:
    a left-right moving unit configured to move the rotating unit from a first measurement position where a first rim provided on one side of a left side and a right side is measured to a second measurement position where a second rim provided on the other side is measured,
    wherein the rotating unit is configured to be positioned between the right temple and the left temple of the eyeglass frame held by the eyeglass frame holding unit even when the rotating unit is moved to the first measurement position and the second measurement position by the left-right movement unit.

8. The eyeglass frame shape measuring apparatus according to claim 7,
    wherein the left-right movement unit is configured to move the rotating unit along an arc shape in a left-right direction of the eyeglass frame about a longitudinal axis which is positioned on the rear side of the eyeglass frame and extends in a longitudinal direction of the eyeglass frame, and
    wherein when the rotating unit is positioned at the first measurement position, the first axis tilts by a first angle with respect to a center line extending in a front-rear direction and passing through a center of the eyeglass frame holding unit in the left-right direction, and when the rotating unit is positioned at the second measurement position, the first axis tilts by a second angle with respect to the center line.

9. The eyeglass frame shape measuring apparatus according to claim 1, wherein the frame holding unit includes:
    a first slider and a second slider which are configured to hold the left and right rims of the eyeglass frame by interposing the rims therebetween in a longitudinal direction of the eyeglass frame when worn; and
    a guide mechanism which is configured to guide at least one of the first slider and the second slider to be movable in the longitudinal direction, and
    wherein the guide mechanism includes a support column member disposed on a rear side of a bridge of the eyeglass frame and between a nose side end of the left rim and a nose side end of the right rim.

10. The eyeglass frame shape measuring apparatus according to claim 9, wherein both right and left ends between the first slider and the second slider are open outward.

11. The eyeglass frame shape measuring apparatus according to claim 9,
wherein the support column member which extends in the longitudinal direction and is configured to support at least one of the first slider and the second slider to be movable in the longitudinal direction, and
wherein the support column member is disposed in a middle portion of the first slider and the second slider in a left-right direction at least between the first slider and the second slider.

12. The eyeglass frame shape measuring apparatus according to claim 11, wherein a width of the support column member in the left-right direction at between the first slider and the second slider is equal to or less than a left-right width of a bridge of the eyeglass frame.

13. The eyeglass frame shape measuring apparatus according to claim 9,
wherein the guide mechanism includes:
a first support mechanism which is configured to support the first slider to be movable in the longitudinal direction;
a second support mechanism which is configured to support the second slider to be movable in the longitudinal direction; and
the support column member which extends in the longitudinal direction and is configured to hold the first support mechanism and the second support mechanism, and
wherein the support column member is disposed at a middle portion of the first slider and the second slider in a left-right direction at least between the first slider and the second slider.

14. The eyeglass frame shape measuring apparatus according to claim 9, further comprising:
an interlocking mechanism which is configured to move the second slider in a direction in which a gap between the first slider and the second slider is widened when the first slider is moved in a direction in which the gap therebetween is widened.

15. An eyeglass frame shape measuring apparatus comprising:
an eyeglass frame holding unit which is configured to hold an eyeglass frame; and
a measuring unit which is configured to measure a shape of a rim of the eyeglass frame by tracing a contour of the rim of the eyeglass frame,
wherein the frame holding unit includes:
a first slider and a second slider which are configured to hold the left and right rims of the eyeglass frame by interposing the rims therebetween in a longitudinal direction of the eyeglass frame when worn; and
a guide mechanism which is configured to guide at least one of the first slider and the second slider to be movable in the longitudinal direction, and,
wherein the guide mechanism includes a support column member disposed on a rear side of a bridge of the eyeglass frame and between a nose side end of the left rim and a nose side end of the right rim.

16. The eyeglass frame shape measuring apparatus according to claim 15, wherein both right and left ends between the first slider and the second slider are open outward.

17. The eyeglass frame shape measuring apparatus according to claim 15,
wherein the support column member extends in the longitudinal direction and is configured to support at least one of the first slider and the second slider to be movable in the longitudinal direction, and
wherein the support column member is disposed in a middle portion of the first slider and the second slider in a left-right direction at least between the first slider and the second slider.

18. The eyeglass frame shape measuring apparatus according to claim 17, wherein a width of the support column member in the left-right direction at between the first slider and the second slider is equal to or less than a left-right width of a bridge of the eyeglass frame.

19. The eyeglass frame shape measuring apparatus according to claim 15,
wherein the guide mechanism includes:
a first support mechanism which is configured to support the first slider to be movable in the longitudinal direction;
a second support mechanism which is configured to support the second slider to be movable in the longitudinal direction; and
the support column member which extends in the longitudinal direction and is configured to hold the first support mechanism and the second support mechanism, and
wherein the support column member is disposed at a middle portion of the first slider and the second slider in a left-right direction at least between the first slider and the second slider.

20. The eyeglass frame shape measuring apparatus according to claim 15, further comprising:
an interlocking mechanism which is configured to move the second slider in a direction in which a gap between the first slider and the second slider is widened when the first slider is moved in a direction in which the gap therebetween is widened.

21. An eyeglass frame shape measuring apparatus comprising:
an eyeglass frame holding unit which is configured to hold an eyeglass frame; and
a measuring unit which is configured to measure a shape of a rim of the eyeglass frame by tracing a contour of the rim of the eyeglass frame,
wherein the measuring unit includes:
a tracing stylus which is inserted into a groove of the rim;
a tracing stylus moving unit which is configured to move the tracing stylus in a radial direction of the rim;
a rotating unit which is configured to rotate the tracing stylus moving unit about a first axis set to pass through an inside of the contour of the rim such that the tip of the tracing stylus traces the rim along the contour of the rim, and which is disposed on a rear side of the eyeglass frame held by the eyeglass frame holding unit; and
a left-right moving unit configured to move the rotating unit from a first measurement position where a first rim provided on one side of a left side and a right side is measured to a second measurement position where a second rim provided on the other side is measured;
wherein the rotating unit is configured to be positioned between a right temple and a left temple of the eyeglass frame held by the eyeglass frame holding unit even when the rotating unit is moved to the first measurement position and the second measurement position by the left-right movement unit;

wherein the left-right movement unit is configured to move the rotating unit along an arc shape in a left-right direction of the eyeglass frame about a longitudinal axis which is positioned on the rear side of the eyeglass frame and extends in a longitudinal direction of the eyeglass frame, and wherein, when the rotating unit is positioned at the first measurement position, the first axis tilts by a first angle with respect to a center line extending in a front-rear direction and passing through a center of the eyeglass frame holding unit in the left-right direction, and when the rotating unit is positioned at the second measurement position, the first axis tilts by a second angle with respect to the center line.

\* \* \* \* \*